(12) United States Patent
Yamauchi (10) Patent No.: US 7,796,189 B2
(45) Date of Patent: Sep. 14, 2010

(54) 2-2 PULLDOWN SIGNAL DETECTION DEVICE AND A 2-2 PULLDOWN SIGNAL DETECTION METHOD

(75) Inventor: Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1062 days.

(21) Appl. No.: 11/505,805

(22) Filed: Aug. 18, 2006

(65) Prior Publication Data

US 2007/0040942 A1 Feb. 22, 2007

(30) Foreign Application Priority Data

Aug. 19, 2005 (JP) .............................. 2005-239071

(51) Int. Cl.
*H04N 7/01* (2006.01)
(52) U.S. Cl. ..................... 348/441; 348/448; 348/459
(58) Field of Classification Search ................. 348/441, 348/97, 701, 700, 458, 459, 448, 451, 452; *H04N 7/01, H04N 5/14*
See application file for complete search history.

(56) References Cited

U.S. PATENT DOCUMENTS 7,612,828 B2 * 11/2009 Winger et al. ............... 348/448
7,705,914 B2 * 4/2010 Yamauchi ................... 348/448
2004/0008275 A1 1/2004 Yang et al.
2005/0018087 A1 1/2005 Lee

FOREIGN PATENT DOCUMENTS

| JP | 3199720 | 6/2001 |
|---|---|---|
| JP | 2002-290927 | 10/2002 |
| JP | 2003-179884 | 6/2003 |

* cited by examiner

*Primary Examiner*—Sherrie Hsia
(74) *Attorney, Agent, or Firm*—Finnegan, Henderson, Farabow, Garrett & Dunner, L.L.P.

(57) ABSTRACT

According to one embodiment, when portions that should be "strong" are decided not to be "weak" on the 2-2 pulldown pattern of an inter-field correlation, if conditions are not established in which the correlation between the current field and the field before its one field is "strong", the correlation between field before its one field and the field before its two field of the current field is "strong", and the correlation between the current field and the field before its one field is "weak", the decision that the input image signal is a 2-2 pulldown signal continues.

13 Claims, 7 Drawing Sheets

2-2 PULLDOWN SIGNAL DETECTION DEVICE AND A 2-2 PULLDOWN SIGNAL DETECTION METHOD

CROSS-REFERENCE TO RELATED APPLICATIONS

This application is based upon and claims the benefit of priority from Japanese Patent Application No. 2005-239071, filed Aug. 19, 2005, the entire contents of which are incorporated herein by reference.

BACKGROUND

1. Field

One embodiment of the invention relates to a 2-2 pulldown signal detection device which detects a pulldown signal generated by a 2-2 pulldown mode from cinema films, etc. and an improved 2-2 pulldown signal detection method.

2. Description of the Related Art

As is generally known, in the PAL (phase alternation by line color television) image signal mode, which is generally known as television broadcast waves, screen flicker is mitigated by interlacing images with an interlaced scan and increasing the equivalent number of images per second.

Meanwhile, recently, television monitors with slim and large screens have been spreading widely, using liquid crystal display devices and plasma display devices, etc. However, when using such display devices and displaying image signals of an interlaced scan for each scan line just as they are, screen luminance decreases and the image becomes not too worthy of admiration.

Consequently, in such display devices, noninterlaced mode is used to display images. That is, if displaying an image signal of an interlaced scan on a display device such as a liquid crystal display device, a conversion circuit is required so as to convert the image signal of the interlaced scan into an image signal of noninterlaced mode.

Herein, in image signals of standard television modes such as PAL mode, etc., image signals generated based on images of cinema film may be included. In other words, cinema film has 24 segments per second, on the other hand, image signals of standard television mode have image signals of interlaced scans at 25 frames per second (50 fields per second).

Consequently, images of cinema film are converted by a 2-2 pulldown method into image signals of standard television mode with interlaced scans. The image signals of interlaced scans generated from cinema films using such a method is referred to as pulldown signal.

For example, in the 2-2 pulldown method, image signal of noninterlaced mode with 24 Hz frame frequency is generated by interlacing cinema films, and one frame of this generated image signal is converted to support two fields. And, this converted field signal repeats odd fields and even fields alternately.

Incidentally, in a conversion circuit which converts pulldown signals into image signals of noninterlaced mode, it is important to detect whether the input image signal is a pulldown signal, and if it is a pulldown signal, conduct a conversion process into noninterlaced mode so as to reproduce the original. In unexamined patent publication bulletin 2002-290927, a structure to detect whether an input image signal is a pulldown method is disclosed.

However, in the pulldown signal detection measures described in unexamined patent publication bulletin 2002-290927, when it comes to a momentarily stationary scene with a 2-2 pulldown signal (several fields), it is decided that it is not a 2-2 pulldown signal, and cannot stably detect a 2-2 pulldown signal.

Also, even when it comes to a scene which is momentarily stationary, if it is made possible to continue the results of detecting that is 2-2 pulldown signal, conversely, it may sometimes miss a small motion and falsely detect that is a 2-2 pulldown signal, even after the input image signal is no longer a 2-2 pulldown signal.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, when portions that should be "strong" are decided not to be "weak" on the 2-2 pulldown pattern of an inter-field correlation, if conditions are not established in which the correlation between the current field and the field before its one field is "strong", the correlation between field before its one field and the field before its two field of the current field is "strong", and the correlation between the current field and the field before its one field is "weak", the decision that the input image signal is a 2-2 pulldown signal continues.

Figure 1:
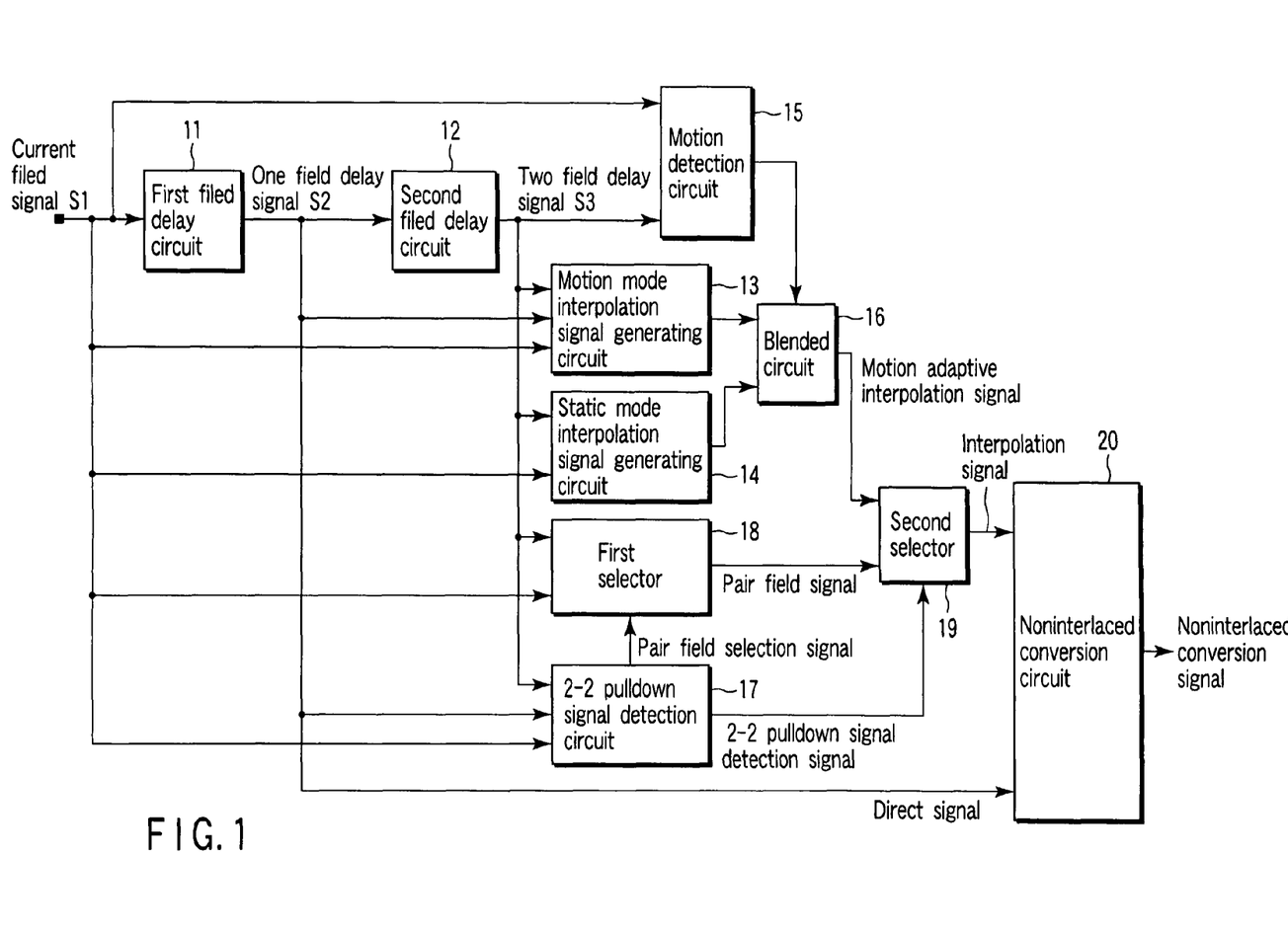
FIG. 1 shows a block diagram illustrating an embodiment of the present invention and explaining an outline of a noninterlaced conversion device.

FIG. 1 shows an outline of a noninterlaced conversion device explained in this embodiment. In other words, the current field signal Si, which is an input image signal of an interlaced scan, is provided to a first field delay circuit 11, and read out, after one field, as a one field delay signal S2.

This first field delay circuit 11, for example, has two memory areas, which are equivalent to one field, and alternately records image signals, which are equivalent to one field, into the two memory areas. Also, the recorded image signal is read out alternately from the two memory areas.

Consequently, when recorded current field signal Si is being read out from first field delay circuit 11 as one field delay signal S2, simultaneously, the next current field signal S1 is recorded to first field delay circuit 11.

Also, one field delay signal S2, which is read out from first field delay circuit 11, is provided to second field delay circuit 12, and read out after one field as two field delay signal S3. The structure and operation of this second field delay circuit 12 is the same as the first field delay circuit 11.

Herein, said current field signal S1, one field delay signal S2 and two field delay signal S3 are provided to motion mode interpolation signal generating circuit 13. This motion mode interpolation signal generating circuit 13 generates, from the current field signal S1, one field delay signal S2 and two field delay signal S3 that have been input, a motion mode interpolation signal, which is disposed between the lines of one field delay signal S2, for example, by a motion compensation interpolation process through motion vectors.

Also, said current field signal S1 and two field delay signal S3 are provided to static mode interpolation signal generating circuit 14. This static mode interpolation signal generating circuit 14 generates, from the current field signal S1 and two field delay signal S3 that have been input, a static mode interpolation signal, which is disposed between the lines of one field delay signal S2, for example, by using the average value of current field signal S1 and two field delay signal S3, or, the value itself of two field delay signal S3.

Further, said current field signal S1 and two field delay signal S3 are provided to motion detection circuit 15. This motion detection circuit 15 detects inter-frame motion from the current field signal S1 and two field delay signal S3 that have been input, and outputs by generating a motion detection signal to blended circuit 16.

This blended circuit 16 generates and outputs a motion adaptive interpolation signal by blending the motion mode interpolation signal which is output from said motion mode interpolation signal generating circuit 13, and a static mode interpolation signal which is output from said static mode interpolation signal generating circuit 14, at a blend ratio according to motion detection signal which is provided from motion detection circuit 15.

Also, said current field signal S1, one field delay signal S2 and two field delay signal S3 are provided to 2-2 pulldown signal detection circuit 17. This 2-2 pulldown signal detection circuit 17 detects, from the current field signal S1, one field delay signal S2 and two field delay signal S3 that have been input, whether one field delay signal S2 is 2-2 pulldown signal, and generates a 2-2 pulldown signal detection signal and pair field selection signal.

Among them, the pair field selection signal is provided to first selector 18. This first selector 18 selects, based on the pair field selection signal that has been input, either the current field signal S1 or two field delay signal S3 as a field which becomes a pair of one field delay signals S2, and outputs this selected signal as the pair field signal to second selector 19.

This second selector 19 selects, if a 2-2 pulldown signal detection signal, which is output from 2-2 pulldown signal detection circuit 17, indicates a 2-2 pulldown signal, a pair field signal, and if not, a motion adaptive interpolation signal which is provided from blended circuit 16, and outputs the selected signal as an interpolation signal to noninterlaced conversion circuit 20.

This noninterlaced conversion circuit 20 aligns (synthesizes), in noninterlaced order, an interpolation signal, which is output from second selector 19, and one field delay signal S2 which is a direct signal, and generates and operates a sequentially operated conversion signal.

Figure 2:
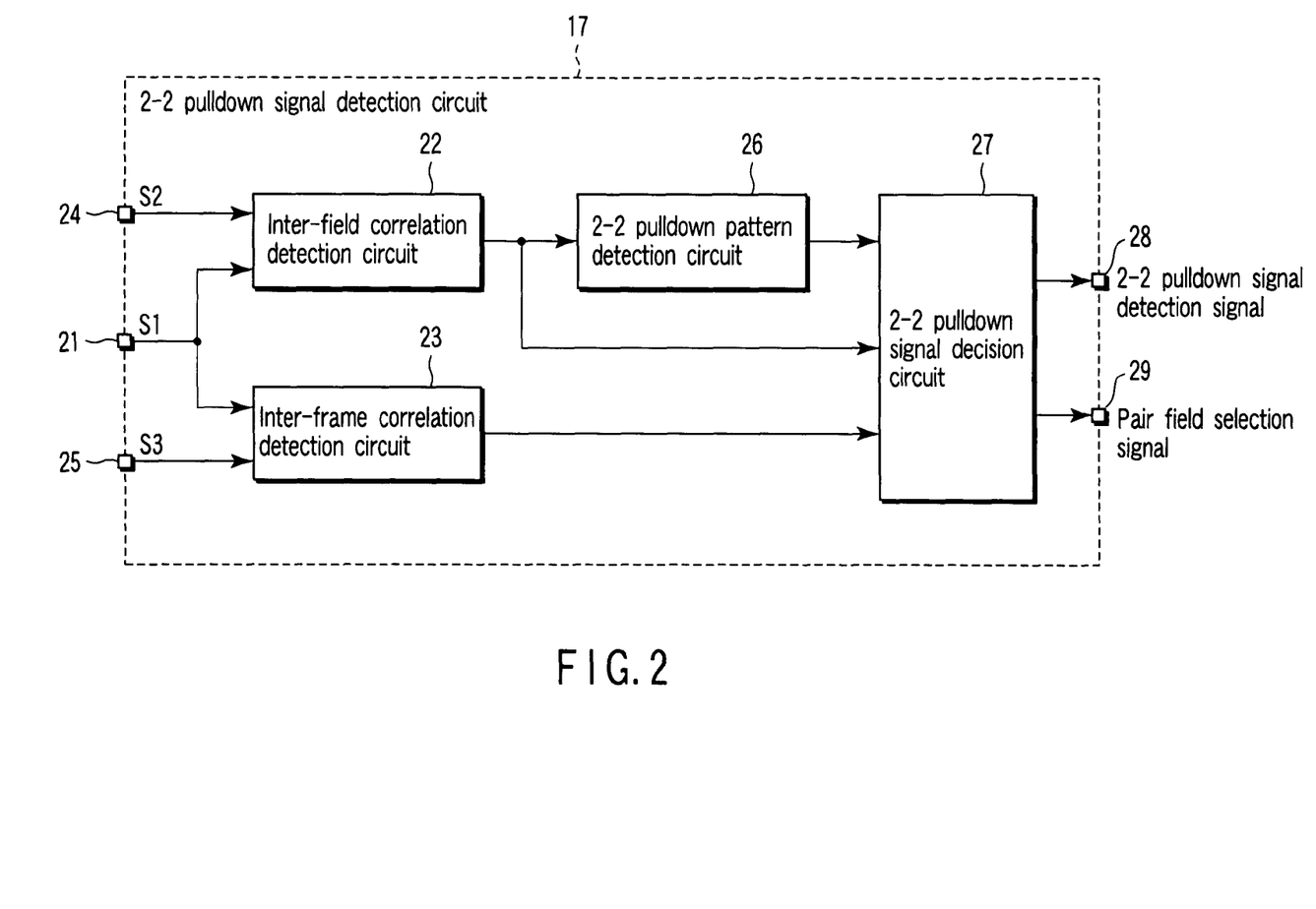
FIG. 2 shows a block diagram explaining an example of a 2-2 pulldown signal detection circuit in the noninterlaced conversion device of the same embodiment.

FIG. 2 shows an example of said 2-2 pulldown signal detection circuit 17. Specifically, said current field signal S1 is provided, via input terminal 21, to inter-field correlation detection circuit 22 and inter-frame correlation detection circuit 23.

Also, said one field delay signal S2 is provided, via input terminal 24, to inter-field correlation detection circuit 22. Further, said two field delay signal S3 is provided, via input terminal 25, to inter-frame correlation detection circuit 23.

Among them, inter-field correlation detection circuit 22 detects correlation between current field signal S1 and one field delay signal S2, and outputs the results of detecting whether the correlation is "strong" or "weak".

Also, inter-frame correlation detection circuit 23 detects the correlation between current field signal S1 and two field delay signal S3, and outputs the results of detecting whether the correlation is "strong" or "weak".

In inter-field correlation detection circuit 22 and inter-frame correlation detection circuit 23, for example, correlation is detected by the following method. First of all, the difference in absolute value of the two input signals is evaluated, and it is decided to be a motion image pixel if this absolute difference value is larger than a given threshold, and a static image pixel if smaller than the given threshold. After that, the number of motion image pixels per screen is counted, and it is decided that correlation is "weak" if the number of motion image pixel is larger than a certain optional threshold, and "strong" if smaller than the given threshold.

In addition, in said correlation detection measures, an example of counting the number of motion image pixels is shown; however, it may be possible to evaluate motion blocks from the absolute difference value of two input signals and counting the number of these motion blocks. Also, it may be possible to evaluate correlation by integrating the absolute difference value of two input signals per screen and comparing this integration value and the given threshold.

Further, the detection output of said inter-field correlation detection circuit 22 is provided to 2-2 pulldown pattern detection circuit 26. This 2-2 pulldown pattern detection circuit 26 detects a 2-2 pulldown pattern, based on results of detecting an inter-field correlation from inter-field correlation detection circuit 22 over multiple fields.

Usually, a 2-2 pulldown pattern becomes a repeated pattern "strong" and "weak" in an inter-field correlation. For example, it detects whether an inter-field correlation over a 10 field period matches the pattern of "strong, weak, strong, weak, strong, weak, strong, weak, strong, weak" or "weak, strong, weak, strong, weak, strong, weak, strong, weak, strong".

Also, detection output of this 2-2 pulldown pattern detection circuit 26, detection output of inter-field correlation detection circuit, and detection output of inter-frame correlation detection circuit 23, are provided to 2-2 pulldown signal decision circuit 27.

This 2-2 pulldown signal decision circuit 27 generates, based on output of 2-2 pulldown pattern detection circuit 26, output of inter-field correlation detection circuit 22, and output of inter-frame correlation detection circuit 23, a 2-2 pulldown signal detection signal indicating whether the input image signal is a 2-2 pulldown signal, and outputs it via output terminal 28 to said second selector 19, as well as generates a pair field selection signal indicating a pair field in the pattern if it is a 2-2 pulldown signal, and outputs it via output terminal 29 to said first selector 18.

Figure 3:
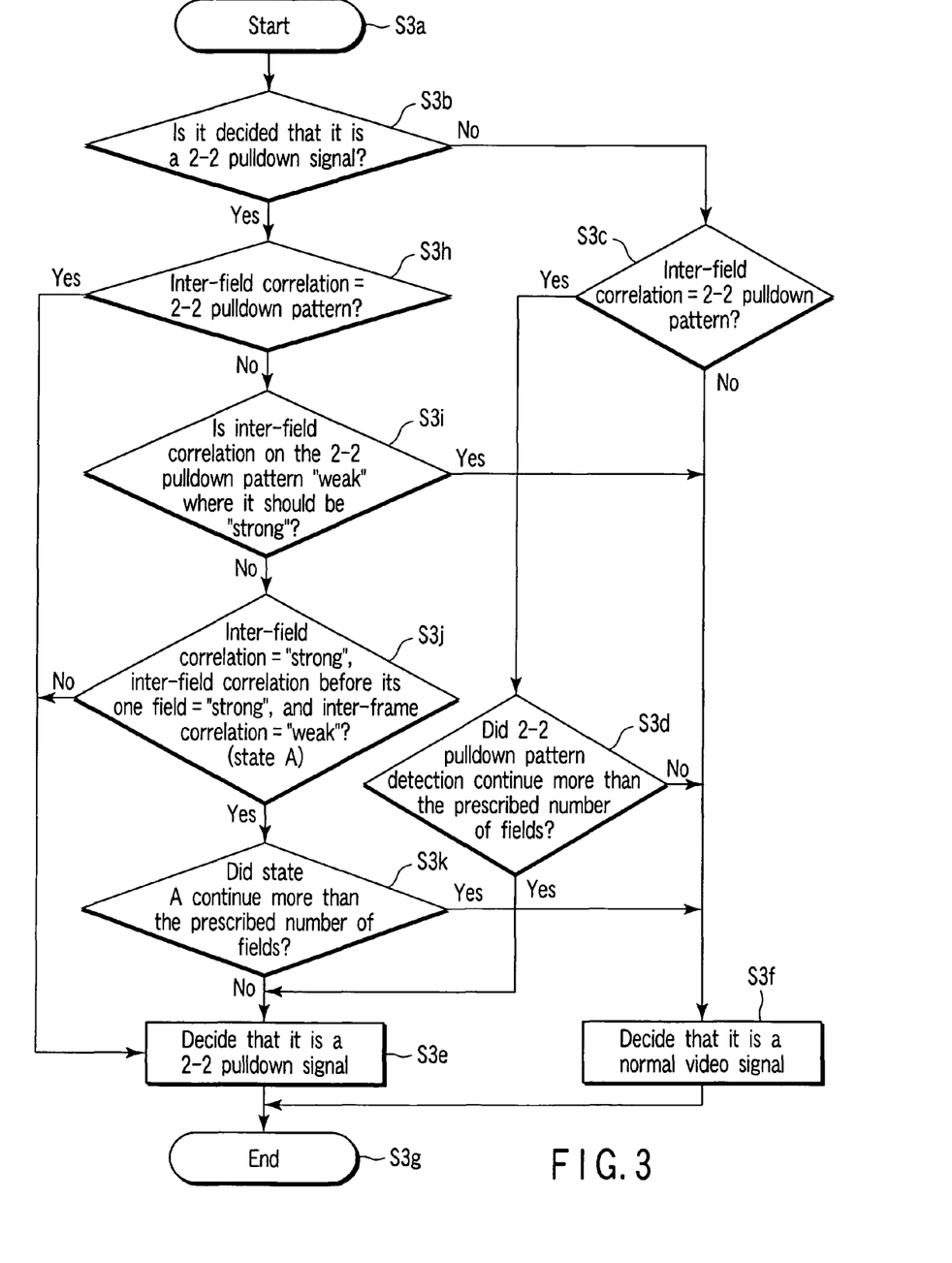
FIG. 3 shows a flow chart explaining an example of a 2-2 pulldown signal decision circuit in the 2-2 pulldown signal detection circuit of the same embodiment.

FIG. 3 shows a flow chart summarizing an example of the decision operation in said 2-2 pulldown signal decision circuit 27. First of all, when decision process starts (step S3a), 2-2 pulldown signal decision circuit 27 discriminates the state of whether the currently input image signal was already decided to be a 2-2 pulldown signal at step S3b.

Also, when the input image signal is decided to be not a 2-2 pulldown signal (No), if the inter-field correlation is judged to be more than a prescribed number of fields, and to match the 2-2 pulldown pattern at steps S3c and S3d, 2-2 pulldown signal decision circuit 27 decides it is a 2-2 pulldown signal at step S3e, otherwise it decides that it is a normal video signal at step S3f and ends the process (step S3g).

Also, in the state in which the input image signal is decided to be a 2-2 pulldown signal at said step S3b (Yes), as long as the inter-field correlation is decided to match the 2-2 pulldown pattern at step S3h, the 2-2 pulldown signal decision circuit 27 continues to decide that it is a 2-2 pulldown signal at step S3e.

On the other hand, if the inter-field correlation is decided to not match the 2-2 pulldown pattern at said step S3h (No), 2-2 pulldown signal decision circuit 27 discriminates at step S3i whether, on the 2-2 pulldown pattern of inter-field correlation, portions that should be "strong" are "weak".

Further, if it is decided on the 2-2 pulldown pattern of inter-field correlation that portions that should be "strong" are "weak" (Yes), 2-2 pulldown signal decision circuit 27 immediately decides it is a normal video signal and ends the process at step S3f (step S3g).

Also, if it is decided at said step S3i on the 2-2 pulldown pattern of inter-field correlation that portions that should be "strong" are not "weak" (No), 2-2 pulldown signal decision circuit 27 moves to the decision at step S3j because there is a possibility of collapse of the 2-2 pulldown pattern of inter-field correlation, due to a static scene.

At step S3j, it is discriminated whether the inter-field correlation is "strong", the inter-field correlation before its one field is "strong" and the inter-frame correlation is "weak" (hereinafter referred to as state A), and if it is decided to be not state A (No), it decides that 2-2 pulldown pattern of inter-field correlation has collapsed due to a static scene, and continues to decide that it is a 2-2 pulldown signal at step S3e.

Also, if it is decided that state A exists at said step S3j (Yes), because it is a state whereby inter-field correlation detection circuit 22 misses small motions, 2-2 pulldown signal decision circuit 27 does not immediately decide that it is a normal video signal, but decides that it is a normal video signal at step S3k if state A continues for a prescribed number of fields.

According to said embodiment, without being influenced by such factors as the collapse of the 2-2 pulldown pattern of inter-field correlation due to a static scene or false detection of a 2-2 pulldown pattern due to missing small motions, it can accurately detect whether the input image signal is a 2-2 pulldown signal.

Figure 4:
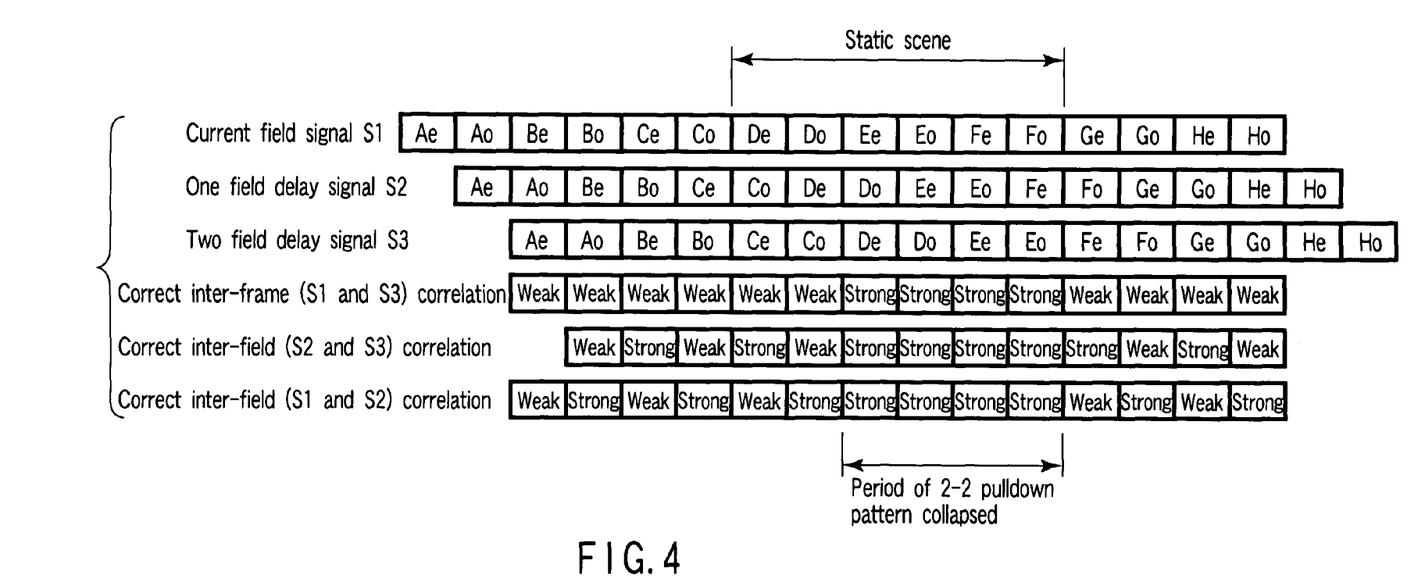
FIG. 4 is a figure explaining the collapse of a 2-2 pulldown pattern of inter-field correlation by static scenes.

Herein, FIG. 4 shows an example of inter-field correlation and inter-frame correlation around a momentarily stationary scene with a 2-2 pulldown signal. In other words, in motion scenes with a 2-2 pulldown signal, inter-field correlation becomes a pattern (2-2 pulldown pattern) in which "strong" and "weak" repeat alternately per field, and inter-frame correlation becomes always "weak".

The 2-2 pulldown signal detection in the current situation decides it is a 2-2 pulldown signal from the fact that the inter-field correlation is a 2-2 pulldown pattern, and decides it is a normal video signal when inter-field correlation is other than a 2-2 pulldown pattern.

However, with such a detection method in the current situation, if there is a momentarily stationary scene with a 2-2 pulldown signal, because inter-field correlation becomes continuously "strong", it is no longer a 2-2 pulldown pattern, and is erroneously decided to be a normal video signal. Because such scenes frequently occur with a 2-2 pulldown signal, although it is a 2-2 pulldown signal, it is erroneously decided to be a normal video signal frequently.

On the contrary, said embodiment, even if inter-field correlation is no longer a 2-2 pulldown pattern due to a static scene, because it is made possible to continuously decide to be a 2-2 pulldown signal when portions that should be "strong" are not "weak" on the 2-2 pulldown pattern of inter-field correlation and it is not state A, erroneous decisions due to static scenes can be prevented.

Figure 5:
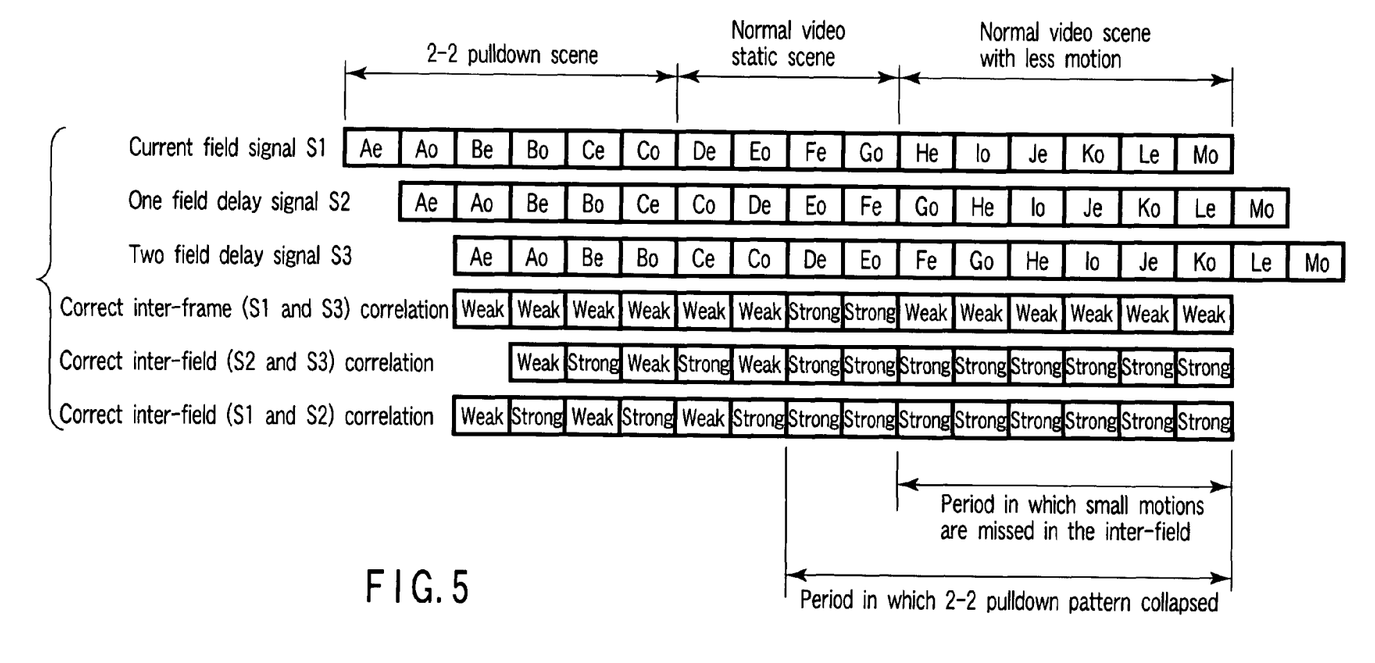
FIG. 5 is a figure explaining the collapse of a 2-2 pulldown pattern of inter-field correlation by scenes with little of the normal motion of video signals.

On the other hand, when continuing the decision in which it is decided to be a normal video signal if it becomes "weak" in a field which should be "strong" on the 2-2 pulldown pattern of inter-field correlation, and to be a 2-2 pulldown signal only by becoming "strong" in a field which should be "weak", in the case shown in FIG. 5, a normal video signal is erroneously decided to be 2-2 pulldown signal.

FIG. 5 shows an example of inter-field correlation and inter-frame correlation in a scene which shifts from a 2-2 pulldown signal to a normal video signal. The inter-field correlation detection calculates the inter-field difference and detects the inter-field correlation where the vertical phase is different.

In static scenes, the inter-field difference has a tendency to become larger than the inter-frame difference due to effects of the vertical high component. Because it is made to decide on this as a static scene, as a result, in a scene with small motions, the inter-field correlation detection comes to decide on the correlation as "strong" more easily than the inter-frame correlation detection.

Consequently, in a scene with fewer motions in a normal video signal as FIG. 5, the inter-field correlation becomes continuously "strong", and results in continuously deciding that is a 2-2 pulldown signal even after shifting to a normal video signal.

On the contrary, in said embodiment, by deciding that it is a normal video signal if it is not "weak" in a field which should be "strong" on the 2-2 pulldown pattern of inter-field correlation, and state A continues more than a prescribed number of fields, it can accurately detect a shift to a normal video signal.

Figure 6:
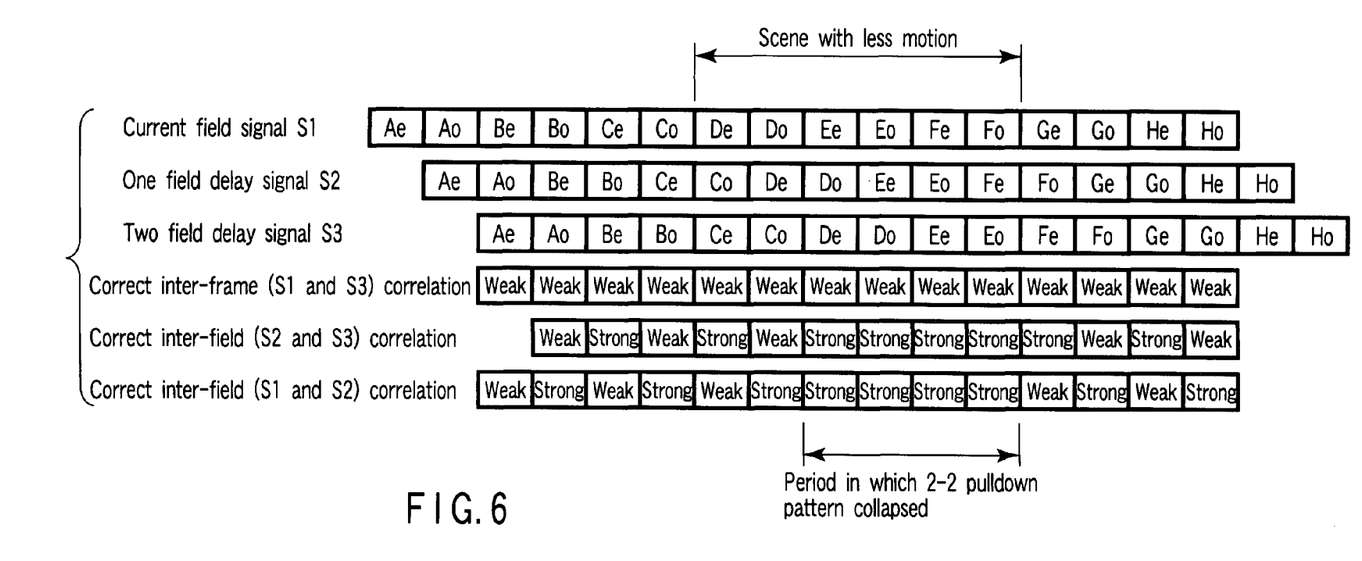
FIG. 6 is a figure explaining the collapse of a 2-2 pulldown pattern of inter-field correlation by scenes with little of the normal motion of 2-2 pulldown signals.

Also, as shown in FIG. 6, if there exists a scene with fewer motions, with a 2-2 pulldown signal, it results in satisfying state A, however, unless state A continues more than a prescribed number of fields, the decision that it is a 2-2 pulldown signal continues, so it can prevent false detection also, with this point.

Figure 7:
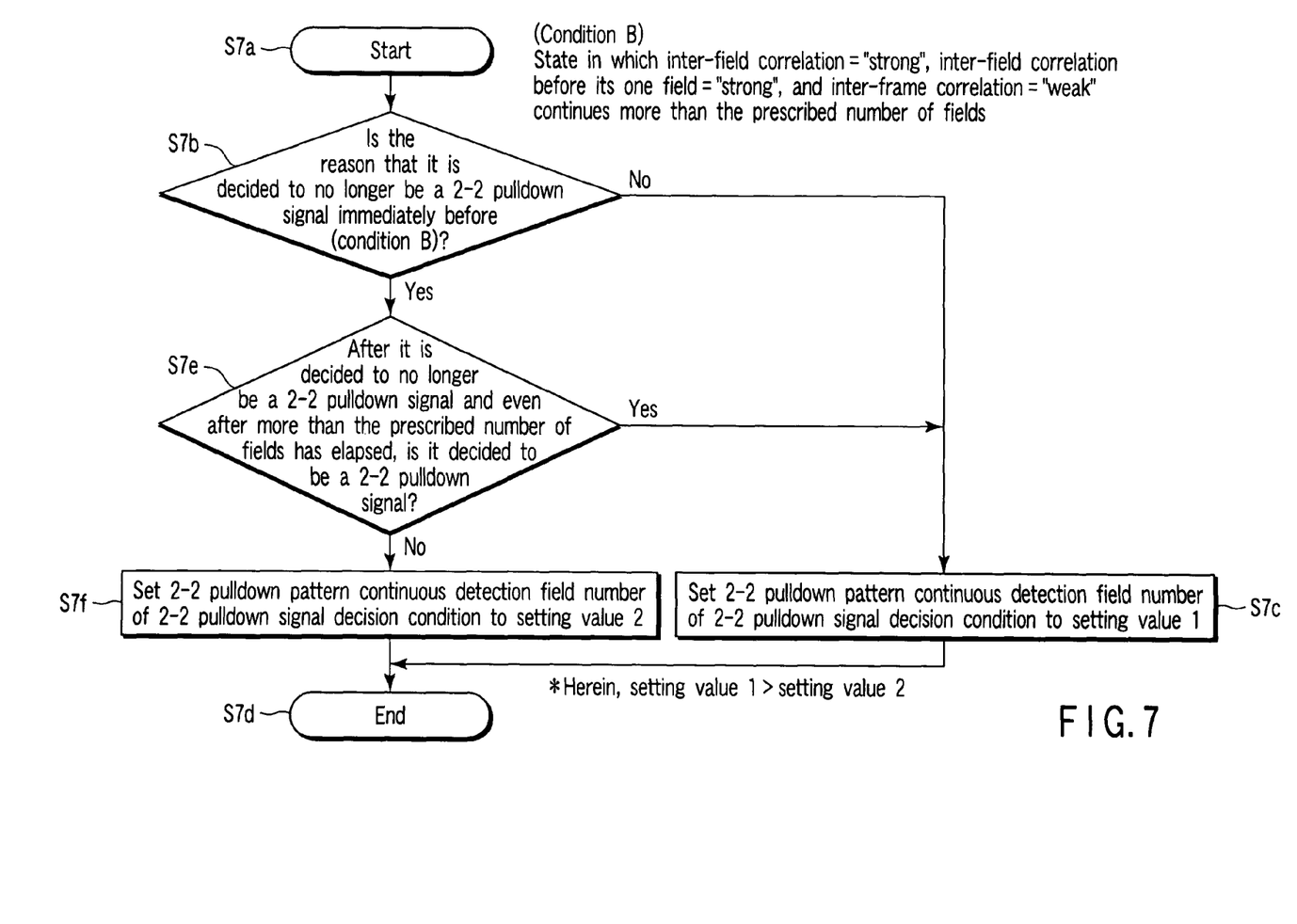
FIG. 7 shows a flow chart explaining an example of improved decision operation in the 2-2 pulldown signal decision circuit of the same embodiment.

FIG. 7 shows a flow chart in which the decision operation of 2-2 pulldown signal decision circuit 27 shown in FIG. 3 is further improved. In other words, when starting (step S7a), 2-2 pulldown signal decision circuit 27 discriminates at step S7b whether the reason it is no longer decided to be a 2-2 pulldown signal is the fact that said state A continues more than a prescribed number of fields (hereinafter referred to as condition B).

Also, if the reason it is no longer decided to be a 2-2 pulldown signal is decided to be due to not satisfying condition B (No), 2-2 pulldown signal decision circuit 27 ends the process at step S7c, and the number of fields (2-2 pulldown pattern number of continuous detection fields) which was previously counted at step S3d of FIG. 3, is set to setting value 1 (step S7d).

Also, if the reason it is no longer decided to be a 2-2 pulldown signal is decided to be due to satisfying condition B at said step S7b (Yes), 2-2 pulldown signal decision circuit 27 decides at step S7e whether the decision result is not changed to a 2-2 pulldown signal even if more than the prescribed number of fields has elapsed, after it is no longer decided to be a 2-2 pulldown signal.

And, if it is no longer decided to be a 2-2 pulldown signal and before more than prescribed number of fields has elapsed (No), 2-2 pulldown signal decision circuit 27 ends the process at step S7f, with the number of fields which is previously counted a the step S3d of FIG. 3, set to setting value 2, which is smaller than the previous setting value 1 (step S7d).

Also, if it is no longer decided to be a 2-2 pulldown signal at said step S7e and even if more than the prescribed number of fields has elapsed, if it is decided that decision result is not changed to a 2-2 pulldown signal (Yes), 2-2 pulldown signal decision circuit 27 ends the process at the step S7c, and the number of fields, which was previously counted at the step S3d of FIG. 3, is set to setting value 1 (step S7d).

In other words, if it is no longer decided to be a 2-2 pulldown signal due to satisfying condition B, in fact, there is a possibility that the input image signal is a 2-2 pulldown signal. Therefore, if it is no longer decided to be a 2-2 pulldown signal due to satisfying condition B, it is made to recover easily to the decision state of being a 2-2 pulldown signal by setting the number of fields, which was counted at step S3d of FIG. 3, to setting value 2 for early return, which is smaller than the previous setting value 1.

However, even if it is no longer decided to be a 2-2 pulldown signal due to satisfying condition B, when it is not decided to be a 2-2 pulldown signal after more than a prescribed number of fields has elapsed, setting value 2 is retuned to the usual setting value 1.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A 2-2 pulldown signal detection device comprising:
    an inter-field correlation detection part, configured so as to detect a prescribed field signal of an input image signal and its correlation with a one field delay signal, and to output the results of detecting whether the correlation is "strong" or "weak";
    an inter-frame correlation detection part, configured so as to detect said prescribed field signal of an input image signal and its correlation with a two field delay signal, and to output the results of detecting whether the correlation is "strong" or "weak";
    a first decision part, configured so as to decide, when the inter-field correlation detected by said inter-field correlation detection part matches the 2-2 pulldown pattern across a prescribed number of fields, that said input image signal is a 2-2 pulldown signal;
    the second decision part, configured so as to decide, when an input image signal has been decided by said first decision part to be a 2-2 pulldown signal, and said inter-field correlation no longer matches the 2-2 pulldown pattern, whether, on the 2-2 pulldown pattern of said inter-field correlation, the portions that should be "strong" are "weak"; and
    a third decision part, configured so as to continue the decision on the 2-2 pulldown signal with respect to said input image signal, when the conditions have not been established in which the correlation between the current field and the field before its one field is "strong", the correlation between the field before the one field of the current field and the field before the two field is "strong", and the correlation between the current field and the field before its two field is "weak", and when it is decided by said second decision part that on the 2-2 pulldown pattern of said inter-field correlation, the portions that should be "strong" are not "weak".

2. A 2-2 pulldown signal detection device according to claim 1, wherein
    when said conditions are established over a prescribed number of fields, said third decision part is configured so as to decide that said input image signal is not the 2-2 pulldown signal.

3. A 2-2 pulldown signal detection device according to claim 2, wherein
    when omitted from the decision that said input image signal is the 2-2 pulldown signal due to the fact that the said conditions are established over a prescribed number of fields, said third decision part is configured so as to set a low value for the number of fields used for the decision by said first decision part that said input image signal is the 2-2 pulldown signal.

4. A 2-2 pulldown signal detection device according to claim 3, wherein
    said third decision part is configured so that from the time it is omitted from the decision that said input image signal is the 2-2 pulldown signal due to the fact that said conditions are established over a prescribed number of fields, if, within a prescribed period, the 2-2 pulldown signal is not detected, the number of fields for deciding, by said first decision part, that said input image signal is the 2-2 pulldown signal, is restored to the original number.

5. A 2-2 pulldown signal detection device according to claim 2, wherein
    said third decision part is configured so as to continue the decision that even if said conditions are established, if kept within the prescribed number of fields, it is the 2-2 pulldown signal with respect to said input image signal.

6. A 2-2 pulldown signal detection device according to claim 1, wherein
    said second decision part is configured so as to decide, when on the 2-2 pulldown pattern of said inter-field correlation, the portions that should be "strong" are "weak", that said input image signal is not the 2-2 pulldown signal.

7. A sequential scan conversion device comprising:
    a field delay part, configured so as to output a one field delay signal where the current field signal of an input image signal is delayed one field period, and a two field delay signal where said one field delay signal is further delayed one field period;
    an interpolated signal generation part, configured so as to generate a first interpolated signal from at least one of said current field signal, one field delay signal and two field delay signal;
    a 2-2 pulldown signal detection part, configured so as to detect a 2-2 pulldown signal from said current field signal, one field delay signal and two field delay signal;
    a first selector, configured so as to select either said current field signal or two field delay signal, and to output it as a pair field signal;
    a second selector, configured so as to select, based on the detection results of said 2-2 pulldown signal detection part, either said first interpolated signal or said pair field signal, and to output it as a second interpolated signal; and a sequential scan conversion part, configured so as to combine said one field delay signal and said second interpolated signal, and to output the sequential scan conversion signal, where said 2-2 pulldown signal detection part is equipped with:

an inter-field correlation detection part, configured so as to detect a prescribed field signal of the input image signal and its correlation with the one field delay signal, and to output the results of detecting whether the correlation is "strong" or "weak";

an inter-frame correlation detection part, configured so as to detect said prescribed field signal of the input image signal and its correlation with the two field delay signal, and to output the results of detecting whether the correlation is "strong" or "weak";

a first decision part, configured so as to decide, when the inter-field correlation detected by said inter-field correlation detection part matches the 2-2 pulldown pattern across a prescribed number of fields, that said input image signal is the 2-2 pulldown signal;

a second decision part, configured so as to decide, when the input image signal has been decided by said first decision part to be the 2-2 pulldown signal, and said inter-field correlation no longer matches the 2-2 pulldown pattern, whether, on the 2-2 pulldown pattern of said inter-field correlation, the portions that should be "strong" are "weak"; and a third decision part, configured so as to continue the decision on the 2-2 pulldown signal with respect to said input image signal, when the conditions have not been established in which the correlation between the current field and the field before its one field is "strong", the correlation between the field before the one field of the current field and the field before the two field is "strong", and the correlation between the current field and the field before its two field is "weak", and when it is decided by said second decision part that on the 2-2 pulldown pattern of said inter-field correlation, the portions that should be "strong" are not "weak".

8. A 2-2 pulldown signal detection method comprising:

a first process to detect the correlation between the signals of prescribed fields of an input image signal and its one field delay signals, and to output the result of detecting whether the correlation is "strong" or "weak";

a second process to detect the correlation between the signals of prescribed fields of said input image signal and its two field delay signals, and to output the result of detecting whether the correlation is "strong" or "weak";

a third process to decide that said input image signal is a 2-2 pulldown signal when the inter-field correlation detected by said first process matches the 2-2 pulldown pattern over a prescribed number of fields;

a fourth process to decide, when an input image signal has been decided by said third process to be a 2-2 pulldown signal, and said inter-field correlation no longer matches the 2-2 pulldown pattern, whether, on the 2-2 pulldown pattern of said inter-field correlation, the portions that should be "strong" are "weak"; and a fifth process to continue the decision on the 2-2 pulldown signal with respect to said input image signal, when the conditions have not been established in which the correlation between the current field and the field before its one field is "strong", the correlation between the field before the one field of the current field and the field before the two field is "strong", and the correlation between the current field and the field before its two field is "weak", and when it is decided by said fourth process that on the 2-2 pulldown pattern of said inter-field correlation, the portions that should be "strong" are not "weak".

9. A 2-2 pulldown signal detection method according to claim 8, wherein when said conditions are not established over a prescribed number of fields, said fifth process decides that said input image signal is not the 2-2 pulldown signal.

10. A 2-2 pulldown signal detection method according to claim 9, wherein when omitted from the decision that said input image signal is the 2-2 pulldown signal due to the fact that the said conditions are established over a prescribed number of fields, said third process sets a low value for the number of fields used for the decision by said third process that said input image signal is the 2-2 pulldown signal.

11. A 2-2 pulldown signal detection method according to claim 10, wherein said fifth process, from the time it is omitted from the decision that said input image signal is the 2-2 pulldown signal due to the fact that said conditions are established over a prescribed number of fields, if, within a prescribed period, the 2-2 pulldown signal is not detected, restores the number of fields for deciding, by said third process, that said input image signal is the 2-2 pulldown signal, to the original number.

12. A 2-2 pulldown signal detection method according to claim 9, wherein said fifth process continues the decision that even if said conditions are established, if kept within the prescribed number of fields, it is the 2-2 pulldown signal with respect to said input image signal.

13. A 2-2 pulldown signal detection method according to claim 8, wherein said fourth process decides, when on the 2-2 pulldown pattern of said inter-field correlation, the portions that should be "strong" are "weak", that said input image signal is not the 2-2 pulldown signal.

* * * * *

UNITED STATES PATENT AND TRADEMARK OFFICE
CERTIFICATE OF CORRECTION

PATENT NO. : 7,796,189 B2
APPLICATION NO. : 11/505805
DATED : September 14, 2010
INVENTOR(S) : Yamauchi It is certified that error appears in the above-identified patent and that said Letters Patent is hereby corrected as shown below:

Claim 1, column 7, line 61, change "a 2-2 pulldown" to --the 2-2 pulldown--.

Claim 3, column 8, line 20, change "that the said" to --that said--.

Claim 10, column 10, line 27, change "that the said" to --that said--.

Signed and Sealed this

Thirtieth Day of November, 2010

David J. Kappos
*Director of the United States Patent and Trademark Office*